Nov. 9, 1954 B. W. BADENOCH 2,693,750
COOKING DEVICE
Filed March 9, 1949 6 Sheets-Sheet 1

Inventor:
Benjamin W. Badenoch,
By Dawson, Orens, Booth and Spangenberg,
Attorneys.

Nov. 9, 1954  B. W. BADENOCH  2,693,750
COOKING DEVICE
Filed March 9, 1949  6 Sheets-Sheet 5

Inventor:
Benjamin W. Badenoch,
By Dawson, Orme, Orth and Spangenberg,
Attorneys.

Nov. 9, 1954     B. W. BADENOCH     2,693,750
COOKING DEVICE Filed March 9, 1949                                6 Sheets-Sheet 6

Inventor:
Benjamin W. Badenoch,
By Dawson, Ooms, Brithey Spangenberg,
Attorneys.

UNITED STATES PATENT OFFICE

2,693,750

COOKING DEVICE

Benjamin Wilson Badenoch, Los Angeles, Calif., assignor of one-half to McGraw Electric Company, Elgin, Ill., a corporation of Delaware Application March 9, 1949, Serial No. 80,482

19 Claims. (Cl. 99—329)

This invention relates to cooking devices and more particularly to devices for automatically baking muffins, cupcakes, popovers and similar articles which are made from batter.

It is highly desirable in an automatic cooking device of this character that the device be so constructed that a partial load can be properly cooked therein. For example, in a device constructed for baking eight muffins or like articles simultaneously, it may be desirable to bake only four such articles at one time. Obviously, the controls must operate to control the cooking operation properly even though the device is only partially loaded if it is to be effective.

It is accordingly one of the objects of the present invention to provide a cooking device in which control of the cooking operation is responsive to a condition of the loaded part of the device only. In the preferred construction the mold plate is split and the cooking operation is terminated in response to the temperature of the coolest portion of the mold plate which will be that portion loaded with batter.

Another object is to provide a simple and inexpensive thermostatic control mechanism cooperating with the mold plate to terminate the cooking operation in response to the mold plate temperature and which deflects in accordance with variations in tension thereon to control termination of a cooking operation. Preferably the thermostatic control mechanism controls a latch which holds the mold plate in cooking position and which allows the mold plate to move to its ejecting position when released.

It has been found that in automatic cooking devices the mold plate may retain sufficient heat at the end of a cooking operation to prevent it from being reset for a succeeding operation due to the fact that its temperature is higher than that for which the thermostatic control is set. It is accordingly an object of the present invention to provide a cooking device which can be reset for a cooking operation regardless of the mold temperature. In one desirable arrangement, as disclosed herein, the thermostatic control which terminates the cooking operation is automatically adjusted to operate at a higher temperature when the device is moved to its loading or cooking position.

Another object is to provide a cooking device in which the thermostatic control for terminating a cooking operation is adjusted to operate at a higher temperature when the cover of the device is opened and is reset to its normal temperature adjustment when the cover is closed.

A further object is to provide a cooking device in which the heating means is controlled in response to oven temperature, and termination of a cooking operation is controlled in response to mold temperature and the adjustment of one temperature control produces a corresponding proportional adjustment of the other. For example, when the oven temperature control is adjusted, the control for terminating a cooking operation also requires a proportional adjustment to insure proper cooking of the batter and the desired browning of the cooked article, and by the present invention the necessary adjustment of both controls is effected simultaneously.

A still further object is to provide a cooking device in which the mold is released to move to its ejecting position when the oven temperature control is turned to its off position. This insures the ejection of any cooked or partially cooked articles in the mold and leaves the device in the desired condition for storage.

A still further object is to provide a simple and inexpensive interlocking control mechanism for producing the desired relationship between the several individual controls to insure proper operation under all conditions.

The above and other objects and advantages of the invention will be more readily apparent when read in connection with the accompanying drawings, in which—

The cooking device, in general, is substantially similar to that more particularly described and claimed in my copending application Serial No. 44,848, filed August 18, 1948, now Patent No. 2,666,380. The present invention, however, provides simplifications of various of the control elements of the prior application plus additional functions and interlocks for improved operation.

As shown particularly in Figures 1 to 4, the device comprises a main casing 10 which is open at its top and which may carry insulating feet 11 to hold it in raised position on a table or the like. Adjacent the ends of the casing internal walls 12 are fixed which serve together with the casing as a frame for supporting the operating mechanism and which provide end chambers in the casing in which various parts of the mechanism may be housed. One side of the casing is closed by a hinged door 13 to provide access to the lower interior part of the casing which forms a warming chamber.

A mold plate indicated generally at 14 is mounted in a horizontal position in the upper part of the casing and is provided with a series of recesses to receive batter. As more particularly described in my copending application Serial No. 44,848, each of the recesses is formed by a plurality of fingers 15 extending downwardly and inwardly from the plate. An ejecting member indicated generally at 16 slidably interfits with and is guided for vertical sliding movement by the fingers and is itself formed with spaced upwardly extending fingers which cooperate with the fingers 15 to form an open topped recess.

Figures 3, 3A, 3B:
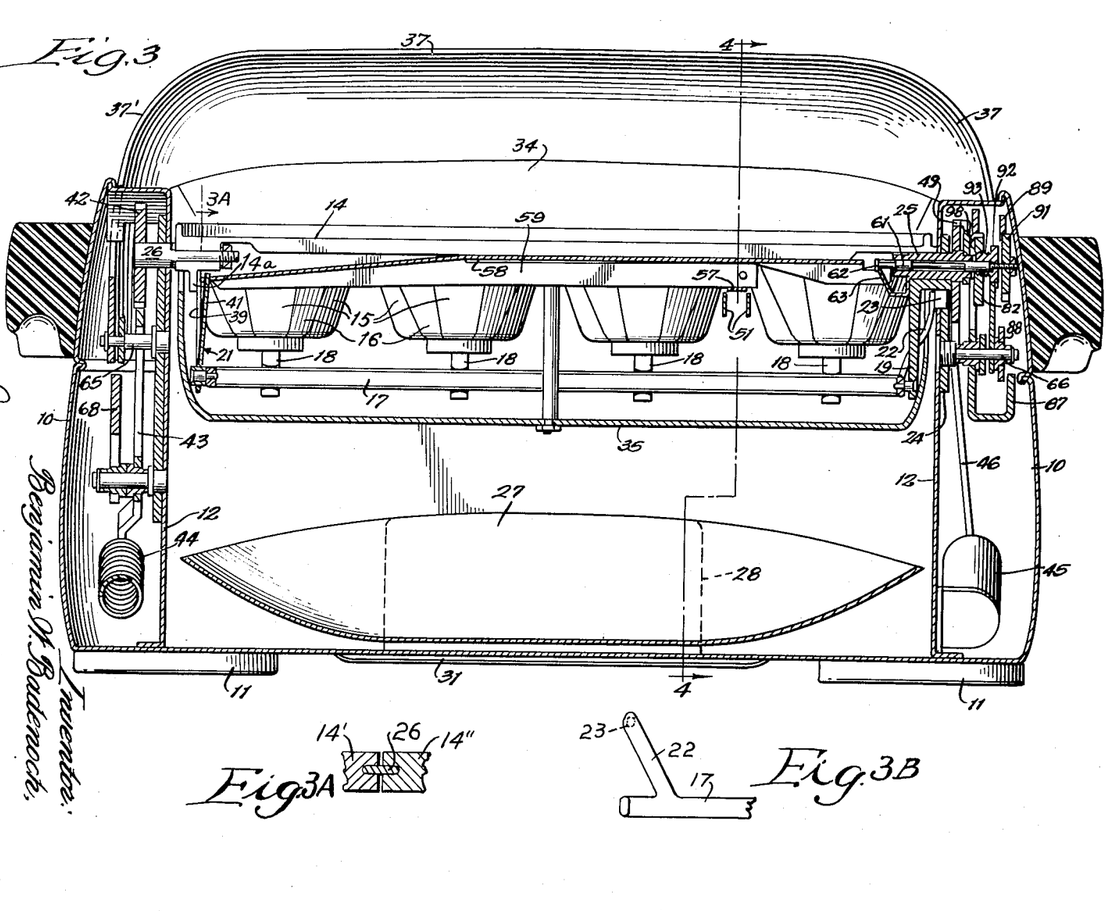
Figure 3 is a central section on the line 3—3 of Figure 1 showing the upper doors in their closed position.
Figure 3A is a partial section on the line 3A—3A of Figure 3.
Figure 3B is a partial end view of the frame 17 showing the arm 22.

The ejector members are controlled for movement to effect ejection of a cooked article by means of a rectangular frame 17 underlying the mold plate and having its sides engaging in notches in projections 18 at the lower ends of the ejector members. The framework 17 is pivoted at one end on a flange 19 on the mold plate and at its opposite end on a suspension support indicated generally at 21 which will be described more fully hereinafter. The frame is formed with an extending arm 22 as shown in Figure 3 which has a cam follower 23 thereon projecting through a slot in the adjacent end plate 12 and cooperating with a cam slot 24' in a supporting plate 24 secured to the adjacent end plate 12. The cam slot is seen more fully in Figure 8. During inversion of the mold plate the follower 23 moves along the cam slot 24' to rock the frame 17 first in one direction and then in the other.

Figure 11:
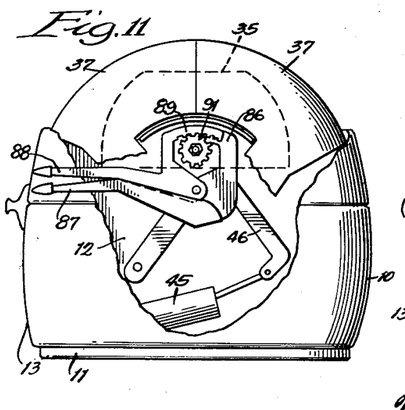
Figures 11 and 12 are views similar to Figure 10 showing the parts in different positions.
Figure 12:
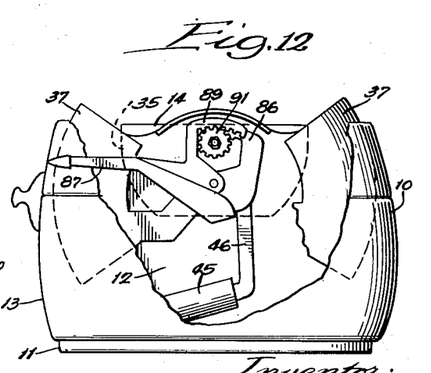

The entire mold plate is mounted for rotation about a horizontal axis between the end plates 12 and for this purpose one end of the mold plate is rigidly secured to a tubular spindle 25 which is pivoted in the adjacent end plate 12 and the support 24. The opposite end of the mold plate is connected to a shaft 26 extending through and journaled in the adjacent end plate 12 so that the entire mold plate can pivot between an upright cooking position as show in Figures 1, 3 and 4 and an inverted ejecting position as shown, for example, in Figure 11. When the mold plate is in its upright position, the frame 17 will be turned to a position by the cam such that the ejector members will align with the fingers 15 to form a smooth inner surface in the receptacles to receive and hold batter. As the mold plate turns from its upright to its inverted position, the action of the cam on the frame 17 will cause it to rock first in one direction and then in the other from its neutral position so that the cooked articles will be completely stripped from the mold plate and will drop freely therefrom when the mold plate is completely inverted.

To receive the cooked articles upon inversion of the mold plate, a removable tray 27 is mounted in the lower part of the casing below the mold plate. The tray may be formed, as best seen in Figure 3, of a continuous metal sheet curved upwardly around its edges to provide a receptacle for cooked articles. At the opposite sides of the tray handles 28 of non-metallic material such as molded plastic are attached thereto and are formed with openings 29 to receive the fingers of a user. With this construction the user can insert his thumb into one of the openings 29 and can grip the lower part of the handle portion below the opening to remove the tray. Since the entire handle is of a non-metallic material and is shielded from the heated mold by the underlying tray, the handle will not become heated to an extremely high temperature and can be handled easily. Cooling may be further assisted by providing ventilation openings 31 in the bottom of the casing immediately below the handles.

The heating means

The mold and the space around the mold is adapted to be heated by means of electrical heating units 32 mounted at the sides of the mold plate in fixed position. The heating units are partially enclosed in casings 33 and shields 34 may be provided adjacent the heating means to prevent direct radiation of heat on top of the cooked articles at the sides of the mold plate.

To distribute heat properly to the mold plate it is formed with a reflecting cover 35 substantially completely underlying the mold plate and enclosing its lower surface. The cover 35 may be formed of a good heat conducting material such as aluminum and may be exposed to the heating elements through openings or slots in the shields 34, as shown at 36. In operation of the device the cover plate 35 will be heated by the heating means and will reflect heat uniformly over the lower surface of the entire mold plate to produce uniform heating of the mold plate.

Figure 4:
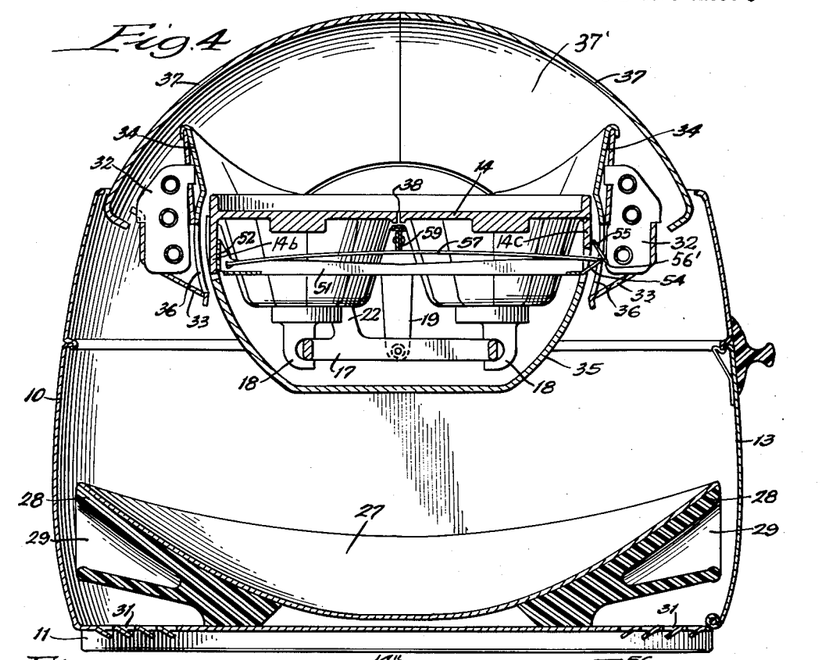
Figure 4 is a transverse section on the line 4—4 of Figure 3.

The open top of the casing is covered by movable doors 37 which are pivotally mounted at 65 and 66 on the casing to move between open and closed positions. When the doors are closed, as shown in Figures 3 and 4, they form with the mold plate an oven space above the mold plate. These doors are also preferably made of good heat conducting material such as aluminum and will be heated by direct exposure to the heating means, as seen in Figure 4. The doors will, therefore reflect and radiate heat over the entire oven space to produce a uniform heating in the oven space and uniform browning of the tops of the articles to be cooked.

The mold construction

According to the present invention the mold is divided into two or more sections or parts which are enabled to expand differently as they are heated. It will be apparent that if batter is placed in the cavities or recesses in only one of the parts that part will be cooled more than the other parts and will expand in response to temperature at a slower rate. According to the present invention, advantage may be taken of this construction to effect control in response to the coolest of the mold parts so that proper control of the cooking under partial load conditions will be obtained.

Figure 1:
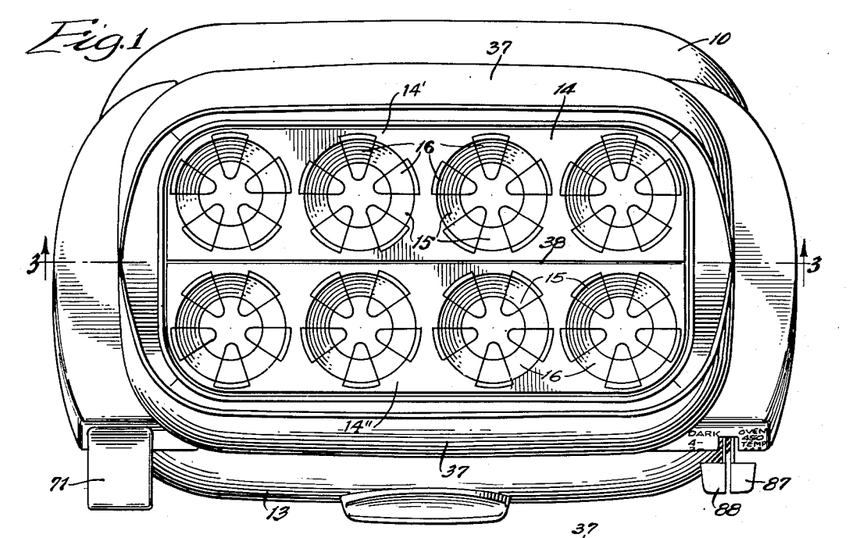
Figure 1 is a top view of a cooking device embodying the invention with the cover open.
Figure 2:
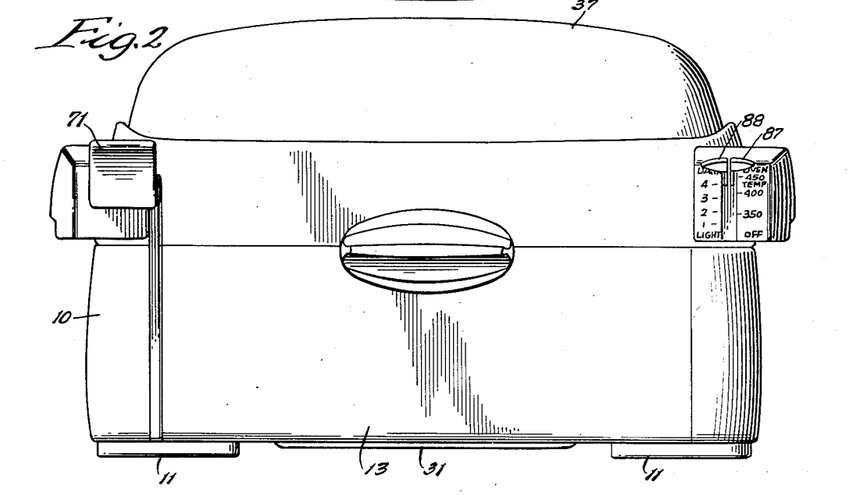
Figure 2 is a side elevation with the cover closed.

As seen in Figure 1, the mold is formed of two parts 14' and 14" separated by a central longitudinal split 38 with the two parts lying side by side parallel to each other. The two parts are both rigidly connected to the tubular spindle 25 at one end of the mold plate so that they can have no relative movement but are freely slidable on the shaft 26 at the opposite end of the mold plate so that they can expand differently. Preferably the shaft is flattened to extend into correspondingly shaped slots in the mold plate sections so that the sections are secured to the shaft against relative rotation but are allowed to slide on the shaft. The parts of the mold plate adjacent the shaft 26 are connected by the spring clip 21 which is shown more in detail in Figure 6. As there shown, the clip 21 comprises a flat sheet of spring material formed with a pair of slots to separate it into end leaves or tongues 39 and a central spring leaf or tongue 41. The end leaves 39 are fastened at their upper ends to the separate mold plate parts by machine screws or the like, and the central leaf 41 is left free. As shown in Figure 3, the end leaves may be fastened to an internal flange 14a on the mold plate halves so that the central leaf will lie inside of the flange and will span the split between the mold plate halves.

Figure 8:
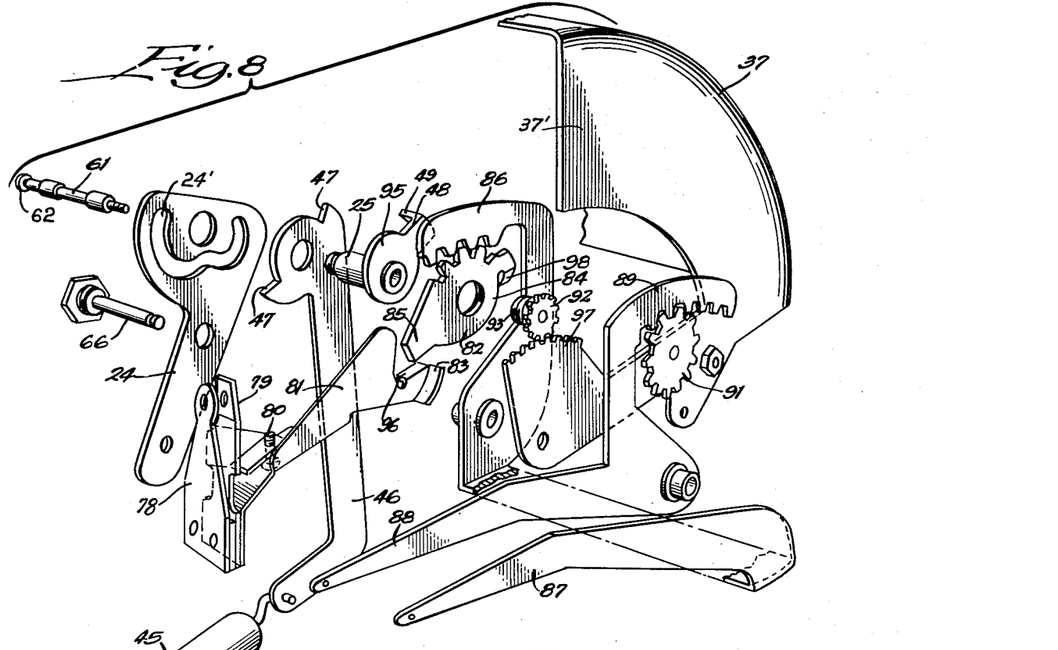
Figure 8 is a perspective disassembled view showing the control adjustments and interlocking mechanism.
Figure 10:
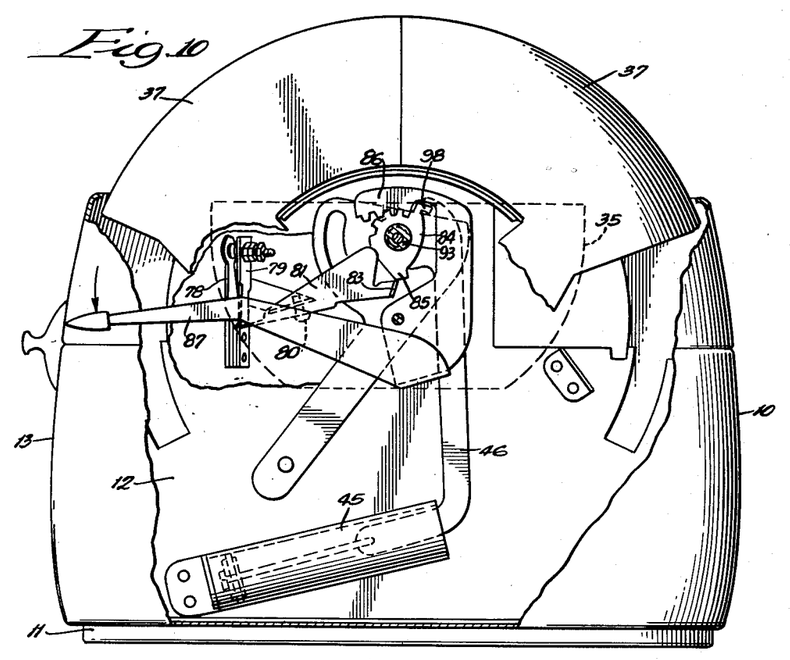
Figure 10 is an end view looking from the right of Figures 1 and 2 with parts of the casing broken away.

The mold plate is normally urged to its ejecting or inverted position, and for this purpose the shaft 26 carries a pinion 42 meshing with a gear segment 43 which is urged by a spring 44 in a direction to invert the mold plate. To prevent the mold plate from moving too rapidly in response to the spring 44, a dashpot 45 is provided having a piston therein connected to an arm 46. The arm 46, as best seen in Figures 8 and 10, is pivoted on the spindle 25 and is formed with a pair of shoulders 47. The spindle 25 carries a projecting arm 48 having an offset flange 49 at its end which is adapted to engage the shoulders 47 as the mold plate and the spindle turn.

When the mold plate is in its upright position, the flange 49 will engage the left shoulder 47, as seen in Figure 8, to pull the piston out of the cylinder 45. During at least the latter part of the motion of the mold plate, the dashpot will be effective to limit the rate of motion of the mold plate so that it cannot be brought to its upright position too rapidly to produce objectionable noise and possibly to damage the parts. When the mold plate inverts in response to the spring 44, the flange 49 will travel through the free space between the shoulders 47, and during the last part only of its motion will engage the right hand shoulder 47 to rock the arm 46 and force the piston into the dashpot cylinder. Thus the dashpot is effective during the last part only of movement of the mold plate in both directions to damp the motion.

The latch control

Figure 5:
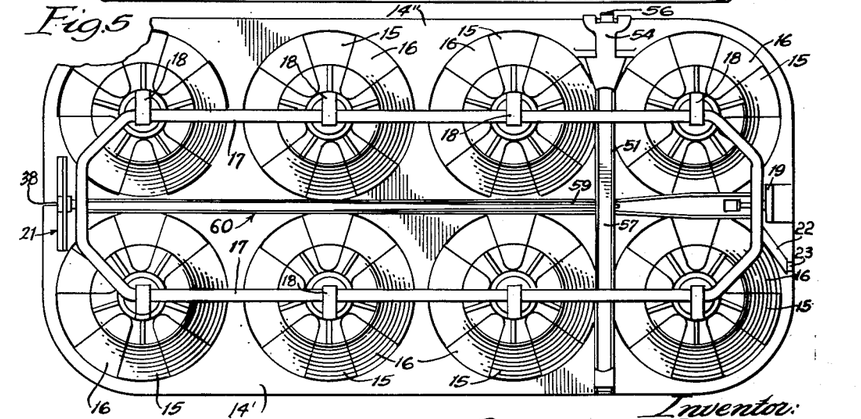
Figure 5 is a bottom view of the mold plate showing the ejection control mechanism and latch control with the reflector pan omitted.
Figure 6:
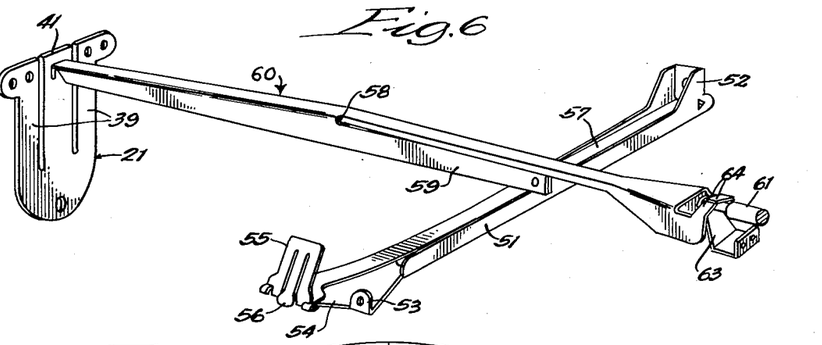
Figure 6 is a perspective view of the latch control mechanism.

In order to hold the mold plate in its upright or cooking position, a latch mechanism is provided which can be released when it is desired to have the mold plate move to its ejecting positions. As shown in Figures 4, 5 and 6, the latch comprises an elongated channel 51 flanged at one end as indicated at 52 for connection to a side flange 14b on the mold plate. The channel extends across the mold plate and is formed at its opposite end with a flat extension terminating in ears 53 for connection to a similar flange 14c on the opposite side of the mold plate. Beyond the ears 53 a flat extension of the channel, as shown at 54, extends upward and outward at an angle and finally upward and inward at an angle, as shown at 55, to provide an angular latch extension. Preferably the latch extension is slitted to form a central latch tongue 56 to engage a stationary latch notch 56' formed in plate 32 adjacent the side of the mold plate as seen in Fig. 4.

The extensions 54 and 55 are flexible to yield in response to a load on the latch so that the latch will release. In order to prevent the latch from releasing, a spring strip 57 is pivotally connected at one end to the flanged extension 52 and at its opposite end to the latch extension 54 adjacent the junction thereof with the angular portion 55. The strip 57 may be a strip of spring steel and normally tends to bow upward, as shown in Figure 4. When upward bowing of the strip is limited, the strip becomes relatively strong in compression and will hold the latch in its engaged position. The strip is so supported that it can also bow downwardly, and when the strip is bowed downward and is relatively unsupported in its central part, it becomes quite weak in compression so that the latch will be released to allow the mold plate to move to its inverted position in response to the spring 44. The web of channel 51 may be cut out as shown in Figure 4 so that the strip 57 may bow downward without restriction.

Bowing of the strip is controlled in response to the temperature of the mold plate to release the mold plate when it attains a predetermined temperature. For this purpose the mold plate parts are utilized as one portion of a thermostatic couple, and a thermostatic bar is provided which will flex in response to variations in tension thereon to bend the strip 57 downward. The thermostatic bar, as best seen in Figure 6, comprises an elongated generally channel shaped member 60 formed of relatively thin metal having its end portions meeting at an angle in the central part of the bar. As shown, the channels are cut away from the web where the end portions of the bar meet, as indicated at 58, so that the end portions of the bar are connected only by the relatively flexible web, and the bar will tend to straighten when tension is applied thereto. Throughout at least a part of one end portion of the bar the flanges are cut away from the web as shown at 58 and are connected by riveting or the like to form an extension 59 which is integrally connected to the sides of the channels in the other end portion of the bar and forms a rigid extension thereof. As seen in Figure 3, it will be apparent that when tension is applied to the bar the extension 59 will have a substantial downward movement, and when the tension is relieved the bar will return to its normal position.

When the bar is assembled, as seen, for example, in Figures 3 and 4, the extension 59 overlies and engages the central portion of the spring strip 57 and in its normal position serves to limit upward movement of the strip. When the bar is tensioned to move the extension 59 downward, the strip 57 will be bowed downward past center so that it becomes weak in compression and will collapse. The pressure exerted by the strip or latch elements 54, 55, 56 is therefore relieved and these elements can flex inward to disengage the notch 56' to release the latch. Thus the latch is controlled in response to variations in tension on the thermostatic bar.

One end of the bar is anchored relative to the adjacent end of the mold plate, and for this purpose a pin 61 is slidably mounted in the spindle 25 for adjustable axial movement therein. At its inner end the pin 61 is formed with a head 62 engaged by the free end of a spring clip 63 which serves to urge the pin toward the center of the mold plate inward. Inward movement of the pin is adjustably limited, as explained more fully hereinafter. One end of the thermostatic bar is formed with a yoke construction 64 to fit over the head of the pin 61 thereby adjustably to anchor the thermostatic bar.

The opposite end of the thermostatic bar is rigidly connected to the center leaf 41 of the spring support 21, as seen in Figure 6. The leaf 41 normally biases the connected end of the thermostatic bar into engagement with the inside of the flanges 14a at the oposite end of the mold plate to limit outward movement of the center leaf and to control the tension on the bar. Since the central leaf and the bar engage the inner surfaces of the flanges on both mold parts, it will be apparent that the tension on the bar will be controlled by the position of the coolest or least expanded of the mold parts. Thus, if only one part of the mold is loaded, release of the latch will be responsive to the temperature of that one part only and will be completely unaffected by the temperature of the other part.

In operation with the mold cocked and in the normal temperature range, the parts will occupy the position shown in Figs. 1, 3 and 4. The thermostatic bar is made of a material having a smaller coefficient of expansion than the material of the mold plate so that as the temperature rises the mold plate will expand more rapidly than the bar. The spring leaf 41 will cause the bar to be tensioned in accordance with the temperature of the coolest of the mold plate parts, and when the temperature thereon becomes sufficient, the extension 59 will move the center of the leaf spring 57 downward to release the latch. Thus at all times release of the latch and termination of the cooking operation are controlled by the coolest of the mold parts so that when the device is only partially loaded proper control will be effected and cooking of the articles will be carried to the desired stage.

The cover construction

The covers 37 referred to above are generally arcuate in section with flanged end portions 37' extending downwardly from the ends thereof so that when in their closed position they will cooperate with the casing completely to close the open top thereof. The covers are pivotally supported on pins 65 and 66 which are supported on the end plates 12 so that the covers can swing pivotally between their open and closed positions.

The covers are adapted to be moved between their open and closed positions by a lever 68 pivoted on a pin 68' concentrically iwth the gear segment 43 at the same end of the casing, which lever may also serve for moving the mold plate from its ejecting to its cooking position. The lever 68 is normally urged upward by a spring 69 and projects through an arcuate slot in the casing to terminate in a finger piece 71 which can easily be engaged to set the device and to control the covers.

Figure 7:
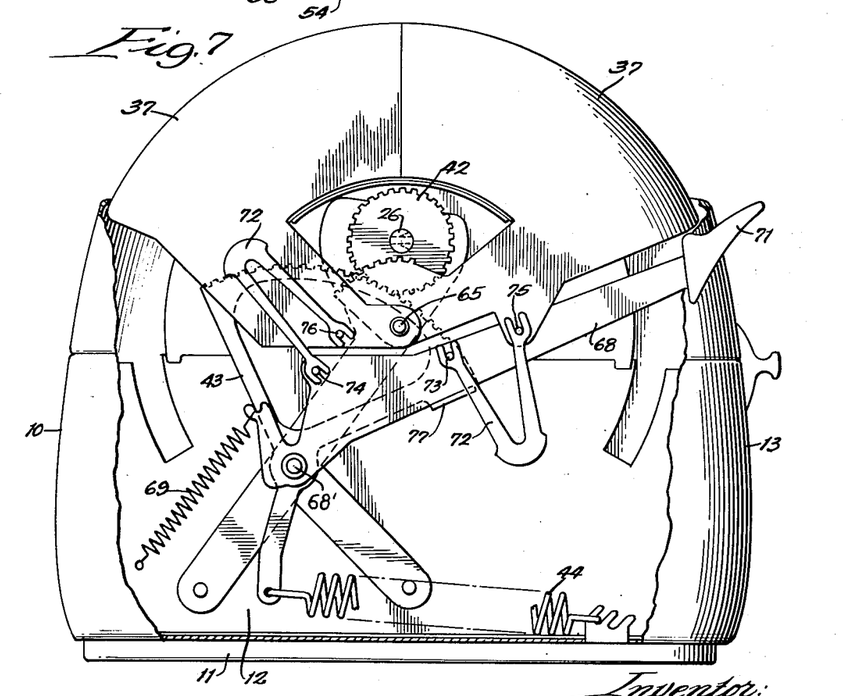
Figure 7 is a view looking from the left of Figures 1 and 2 with parts of the casing broken away.
Figure 9:
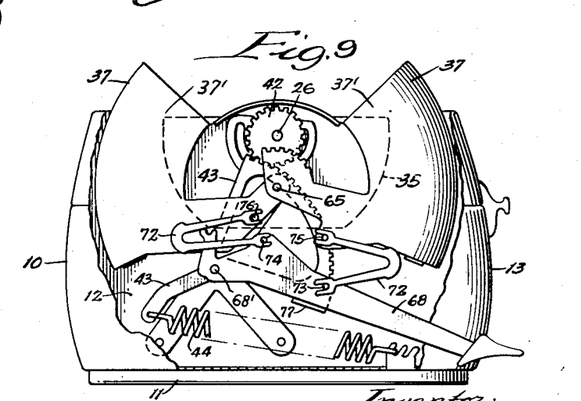
Figure 9 is a view similar to Figure 7 showing the covers in open position.

To connect the covers to the lever, V-shaped spring elements 72 are provided having slots in their ends to fit over appropriate pins. As shown, the lever carries pins 73 and 74, and the cover members carry pins 75 and 76, respectively. The slots in the ends of one of the spring members fit over the pins 73 and 75 and those in the opposite spring member fit over the pins 74 and 76, as best seen in Figures 7 and 9. When the lever 68 is in its upper normal position, as shown in Figure 7, the covers will be closed and will be resiliently held closed by the action of the spring members 72 which are at that time slightly compressed. As the lever 68 is swung downward, the relationships of the pins and spring members will change to that shown in Figure 9 to move the covers to their open position. It will be noted that the pins and spring members operate in the manner of a toggle mechanism during this operation so that the spring members tend to hold the lever and covers in either of their extreme positions to which they have been moved. Due to the locations of the pins during the initial part of the movement in either direction they tend to separate the ends of the spring members, and during the final part of their movement they compress the ends of the spring members together to provide a light toggle action. Thus when the lever is moved downward it will tend to stay down until it is positively moved up again, and when it is moved upward it will tend to stay up with the covers closed until it is positively moved down again.

Downward movement of the lever may also serve to return the mold plate from its ejecting to its cooking position. For this purpose the gear segment 43 is formed with a flange 77 projecting into the path of movement of the lever 68 to be engaged thereby. When the mold plate is in its upright position, as shown in Figure 9, the gear segment 43 will be rocked clockwise, and if the lever is at that time raised it will be out of contact with the flange 77. When the mold plate tilts to its ejecting position, the segment 43 will move to the position shown in Figure 7, and the flange 77 thereon will move into contact with the lower side of the lever 68. If the lever 68 is swung downward, it will engage the flange 77 rocking the gear segment clockwise and through engagement of the gear segment with the pinion 42 will turn the mold plate to its upright position. At the same time the covers will be opened and will be held open as long as the lever is depressed for loading the device with batter. When the device is loaded, the mold plate will be held upright by the latch, and the covers may be closed by raising the lever 68 for a cooking operation.

The oven temperature control

The heating means is normally controlled in response to the temperature in the oven space to maintain the temperature at a selected predetermined value. For this purpose the heating elements are connected in circuit with a thermostatic switch mechanism, as shown in Figures 8 and 10, which comprises a thermostatic switch blade 78 formed of bi-metal or the like to deflect in response to temperature and a cooperating flexible blade 79. The blades 78 and 79 may carry contacts which will engage to complete a circuit through the heating element and which will disengage in response to deflection of either of the blades to interrupt the circuit. Normally the contact 79 is set in a position corresponding to the desired temperature, and the bi-metal blade 78 will deflect in response to temperature changes to maintain the temperature at the desired value.

In order to adjust the temperature setting, the blade 79 has adjustably connected thereto by a screw 80 an angular extension 81 formed to cooperate with a temperature control cam 82 to select the position of the blade 79. The arm 81 is formed with a cam engaging flange 83 which normally engages the cam surface 84 of the cam 82 to position the arm and the contact blade 79 for the desired temperature. The cam 82 is also provided with a projection 85 at one end to engage the flange 83 and rock the contact 79 to its extreme or off position when the cam is turned to its maximum extent in one direction.

The cam 82 is formed with a set of gear teeth at its upper surface meshing with corresponding gear teeth on an angular extension 86 of a control lever 87 which is mounted in the casing to project through an arcuate slot in the front thereof. The lever 87 can be manually moved as desired to set the oven temperature for any desired value, and when so set, the oven temperature will be automatically maintained by operation of the bi-metal blade 78. When the oven temperature is to be shut-off, the lever 87 can be moved to its extreme downward position to bring the projection 85 into engagement with the flange 83 and open the switch entirely.

Control adjustments and interlocking

In addition to control of the oven temperature, it is desirable to adjust the mold temperature at which the latch will release to determine the degree of darkness of the cooked article. For this purpose a control lever 88 is provided having a gear segment 89 thereon meshing with a gear 91 which is rigidly secured to the outer end of the pin 61. As shown the pin 61 has a threaded end portion on which the gear 91 may be rigidly mounted and on which is also threaded a small pinion 92. The pinion 92 has an eccentric hub 93 which is externally threaded to receive the cam 82. As best seen in Figure 3, the cam 82 engages the end of the spindle 25 to limit inward movement of the pin 61. The projecting arm 48 of the spindle 25 is formed with an eccentric cam shaped hub portion 95 registering with a flange 96 on the arm 81 to adjust the oven temperature control when the mold plate is inverted. The pinion 92 meshes with a gear segment extension 97 on one of the doors so that the pinion will be turned as the doors are opened and closed.

The oven temperature control can be set through the lever 87, as explained above, and the desired degree of darkness of the cooked articles can be set by moving the lever 88 to adjust the latch release control temperature. When this lever is moved, the pin 61 will be turned through the gear 91 and will thread into or out of the pinion 92 which is held stationary by the rack 97 thereby to shift the head of the pin 61 inward or outward to adjust the point at which sufficient tension will be produced in the termostatic control bar to release the latch. Movement of pinion 92 toward the mold plate is prevented by engagement of cam 82 with the end of spindle 25 and threading of hub 93 into cam 82 and spring 63 serves to hold cam 82 in engagement with the end of spindle 25.

I have found that when the oven temperature control is adjusted, it is necessary to make a simultaneous proportional adjustment of the latch release temperature control in order to obtain proper cooking. For example, when the oven temperature control is reduced for slower cooking, the articles will be browned to a greater extent if the latch release temperature is not also reduced slightly due to the longer cooking period. Therefore, according to the present invention, the oven temperature control is interlocked with the release temperature control to effect a simultaneous adjustment.

In the mechanism shown this is accomplished by the threaded connections between the cam 82, the pinion 92 and the pin 61. Since the cam 82 through engagement with the spindle 25 and connection to the pinion 92 through the hub 93 serves to position the pin 61 axially, any turning of the cam 82 through the lever 87 will simultaneously cause an axial movement thereof on the threaded hub 93 to move the pin 61 axially. By properly designing the pitch of the threads relative to the cam lift, any desired amount of adjustment of the latch release control by turning of the oven temperature control cam can be obtained. Thus a proper proportional adjustment between the temperature of the mold at which the latch will be released and of the oven temperature is obtained simply by moving the one lever 87.

It is also desirable when the mold inverts to its ejecting position to reduce the oven temperature setting so that the mold and other parts of the device will not be overheated and articles held in the warming pan will not be overcooked. The cam 95 accomplishes this purpose by engagement with the flange 96 on the switch blade arm 81. With the mold in its upright position the cam 95 will occupy the position shown in Figure 8 in which its portion of minimum radius is opposite the flange 96 and will be out of engagement therewith. Thus in the cooking position the setting of the oven control thermostat is controlled solely by the cam 82. When the mold inverts, the cam 95 will turn with it and will engage the flange 96 to rock the lever 81 clockwise and move the contact 79 slightly away from the bi-metal contact 78. This will set the oven temperature control thermostat for a lower temperature value sufficient to maintain the space below the mold plate warm without excessively heating the mold plate or other parts of the device and without heating the articles held in the warming tray to an excessively high value. In this way the articles can be left in the tray for a substantial period of time and will be kept warm without being overcooked.

It has been found that under some conditions the mold plate may retain sufficient heat at the end of a cooking operation so that it can not immediately be reset for a succeeding operation without a cooling period. For example, if the temperature of the mold plate should be above its release temperature, the latch would not engage when the mold plate is turned to its cooking position. To eliminate this the pinion 92 connected to the doors is provided so that whenever the doors are opened the pinion will be turned through approximately 180°. Since the pinion is threaded on the pin 61, it will move the pin 61 axially to the left during this operation, as seen in Figure 3. This has the effect of relieving tension on the latch control bar so that it will return to its normal position irrespective of the temperature of the mold plate as long as the doors remain open. Thus the latch can engage even though the mold plate should be above its normal release temperature during the loading period. Placing of the cool batter in the recesses in the mold plate will cool it sufficiently so that when the covers are closed and the pinion 92 is turned back to its normal position the latch will remain engaged for a normal cooking operation.

In addition to setting the latch release temperature, opening of the doors also reduces the setting of the oven control thermostat so that the oven will be held at a lower temperature as long as the doors are open. This effect is produced by the eccentric hub 93 on the pinion 92 carrying the cam 82 so that when the pinion 92 is turned the cam 82 will be moved downward to rock the blade 79 away from the blade 78. This has the effect of adjusting the oven control thermostat for a lower temperature as long as the doors remain open. When the doors are closed and the pinion 92 returns to its normal position, the normal setting of the oven control thermostat as determined by the control lever 87 will be re-established.

When the oven control thermostat is set to shut-off the heat, it is desirable that the mold shall be inverted to its ejecting position to insure that no cooked or partially cooked articles will be left therein and to place the parts in the desired condition for storage. For this purpose the cam 82 carries on its inner face an angular projecting lug 98 which is normally out of engagement with the arm 48 in all normal positions of the cam and arm. However, when the cam 82 is turned counterclockwise, as seen in Figure 8, to its maximum off position, the projection 98 will engage the arm 48 to move the cam 82 and the pin 61 to the right thereby increasing the tension on the thermostatic latch control bar. An increase in tension on this bar will trip the latch, as explained above, allowing the spring 44 to turn the mold plate to its inverted or ejecting position. Thus, whenever the oven thermostat is turned off, the mold will be inverted to eject any cooked or partially cooked articles therefrom and to leave the mold plate in the desired position for storage.

Operation

In operation, with the heating unit connected to a source of electric current such as the usual lighting circuit, the oven temperature control and the latch release control can be set to the desired values depending upon the type of batter to be cooked and the brownness desired. After a suitable warming period, the lever 68 may be rocked downward to move the mold to its upright position and simultaneously to open the doors. At this time batter may be placed in the cavities in the mold plate, and the lever 68 can be moved upward to close the doors and start the cooking cycle.

During a cooking operation the heating elements will be controlled by the oven temperature control mechanism to maintain the oven temperature at the preset value so that the batter will cook at the desired rate. It will be noted that during cooking the mold plate itself is heated as well as the oven space above the mold plate and the heating will be substantially uniform throughout due to the reflector pan 35 and reflection of heat from the covers into the oven space. When the mold plate reaches the preset temperature, the latch will release allowing the mold plate to invert. During this operation the cooked articles will be stripped from the mold plate by movement of the ejector mechanism 16 so that when the mold plate is fully inverted, the cooked articles will fall therefrom into the warming pan 27. If desired, the articles can be left in this warming pan, and they will not be overcooked due to reduction of the oven temperature through the interlocking control mechanism described above.

To cook a second batch of articles, it is necessary only to repeat the operations as described above. Upon completion of the desired number of articles, the oven temperature control level 87 is preferably moved to its off position to shut-off the power from the heating elements and to invert the mold plate. The device may then be left until it is desired to cook additional articles at which time the entire operation can be repeated.

While one embodiment of the invention has been shown and described in detail herein, it will be understood that this is illustrative only and is not to be taken as a definition of the scope of the invention, reference being had for this purpose to the appended claims.

What is claimed is:

1. A cooking device comprising a mold plate split into a plurality of separate parts with the parts connected at one edge of the mold plate, heating means to heat the parts, an elongated control member extending along the mold plate in the same general direction as the split and formed of a material having different thermal expansion characteristics than the mold plate, control means operated by said member in response to changes in tension thereon to terminate a cooking operation, means to connect one end of said member to said one edge of the mold plate, and an anchor piece resiliently engaging all of said mold parts adjacent the opposite edge of the mold plate and connected to the other end of the member to vary the tension on the member in response to the temperature of the coolest of the parts.

2. A cooking device comprising a mold plate split into a plurality of separate parts with the parts connected at one edge of the mold plate, heating means to heat the parts, an elongated control member extending along the mold plate in the same general direction as the split and formed of a material having different thermal expansion characteristics than the mold plate, control means operated by said member in response to changes in tension thereon to terminate a cooking operation, means to connect one end of said member to said one edge of the mold plate, the mold plate parts at the opposite edge of the mold plate being formed with aligned shoulders transverse to the mold plate, and an anchor piece resiliently engaging all of said shoulders and connected to the other end of the control member to vary the tension thereon in response to the temperature of the coolest of the parts.

3. A cooking device comprising a mold plate split into a plurality of separate parts with the parts connected at one edge of the mold plate, heating means to heat the parts, an elongated control member extending along the mold plate in the same general direction as the split and formed of a material having different thermal expansion characteristics than the mold plate, control means operated by said member in response to the changes in tension thereon to terminate a cooking operation, means to connect one end of said member to said one edge of the mold plate, flanges on the parts at the opposite edge of the mold plate presenting aligned internal shoulders when the parts are at the same temperature and an anchor piece connected to the other end of the control member and resiliently engaging all of the shoulders to vary the tension on the control member in response to the temperature of the coolest of the parts.

4. A cooking device comprising a mold plate split into a plurality of separate parts with the parts connected at one edge of the mold plate, heating means to heat the parts, an elongated control member extending along the mold plate in the same general direction as the split and formed of a material having different thermal expansion characteristics than the mold plate, control means operated by said member in response to the changes in tension thereon to terminate a cooking operation, means to connect one end of said member to said one edge of the mold plate, said parts being formed with aligned shoulders at the opposite edge of the mold plate and a leaf spring resiliently engaging all of the shoulders and connected to the other end of the control member to vary the tension thereon in response to the temeprature of the coolest of the parts.

5. A cooking device comprising a frame, a mold plate carried by the frame and longitudinally split into two parts connected at one end, heating means to heat the mold plate, a leaf spring formed with a pair of spaced slits to divide it at one end into three leaves, the outer leaves being connected respectively to said parts at the opposite end of the mold plate and the center leaf resiliently engaging both of the parts, an elongated control member of a material having different thermal expansion characteristics than the mold plate connected at one end to the center leaf, means connecting the other end of the control member to said one end of the mold plate, and control means operated by the control member in response to changes in tension thereon.

6. A cooking device comprising a frame, a mold plate pivoted on the frame at its ends for movement from an upright to an inverted position, the mold plate being centrally split into two parts connected at one end, heating means to heat the mold plate, means resiliently urging the mold plate to its inverted position, a latch releasably to hold the mold plate in its upright position, an elongated latch control member having different thermal expansion characteristics than the mold plate, means connecting one end of said member to the mold plate adjacent said one end, an anchor piece connected to the other end of the member and resiliently engaging the mold plate parts adjacent the other end of the mold plate, and means responsive to variations in tension in said member to control the latch.

7. A control member for use in a cooking device comprising a pair of elongated relatively rigid end portions flexibly connected in end to end relation normally lying at an angle to each other, and an extension on one of the end portions normally lying adjacent to the other end portion and free therefrom whereby the extension will move toward and away from said other end portion as the tension on the member is varied and a supporting element to which the opposite ends of the control member are secured and which is expansible to vary the tension on the member.

8. A control member for use in a cooking device, comprising an elongated channel shaped strip with its end portions being substantially straight and meeting at an angle, the channel sides being separated from the web adjacent the meeting point of the end portions to provide a flexible connection between the end portions, portions of the channel sides being separated from the remainder of the channels throughout at least a part of the length of one of the end portions to form an extension on the other end portion which will move toward and away from said one end portion in response to changes in tension on the strip and a supporting element to which the opposite ends of the strip are secured and which is expansible to vary the tension on the strip.

9. A control member for use in a cooking device, comprising an elongated channel shaped strip with its end portions being substantially straight and meeting at an angle, the channel sides being separated from the web adjacent the meeting point of the end portions to provide a flexible connection between the end portions, portions of the channel sides being separated from the remainder of the channels throughout at least a part of the length of one of the end portions to form an extension on the other end portion which will move toward and away from said one end portion in response to changes in tension on the strip and a supporting element to which the opposite ends of the strip are secured and which is expansible to vary the tension on the strip and a flexible strip loaded in compression normally bent toward the free end of the extension and adapted to be bowed by movement of the extension so that the flexible strip can yield to compression.

10. A cooking device comprising a mold plate adapted to hold batter and the like to be cooked and means mounting the mold plate for movement from a cooking to an ejecting position, resilient means urging the mold plate to its ejecting position, a latch releasably to hold the mold plate in its cooking position, heating means adjacent to the mold plate to heat it, thermostatic means responsive to the temperature of the mold plate controlling the latch to release it in response to a predetermined temperature, a cover over the mold plate movable from an open to a closed position, and means operated by opening of the cover and connected to the thermostatic means to adjust the thermostatic means to hold the latch engaged until a higher predetermined temperature is reached.

11. A cooking device comprising a mold plate adapted to hold batter and the like to be cooked and means mounting the mold plate for movement from a cooking to an ejecting position, resilient means urging the mold plate to its ejecting position, a latch releasably to hold the mold plate in its cooking position, heating means adjacent to the mold plate to heat it, thermostatic means responsive to the temperature of the mold plate controlling the latch to release it in response to a predetermined temperature, a cover over the mold plate movable from an open to a closed position, a control handle movable to one position to move the mold plate from its ejecting to its cooking position and to another position to allow the cover to close and means operated by movement of the handle to said one position to change the setting of the thermostatic means to hold the latch engaged until a higher temperature is reached and by movement of the handle to said other position to return the thermostatic means to its initial setting.

12. A cooking device comprising a mold plate, heating means adjacent to the mold plate to heat it, a cover, means mounting the cover for movement from an open to a closed position over the mold plate, an elongated thermostatic member having a different coefficient of expansion than the mold plate extending parallel to the mold plate, means connecting one end of the member to one end of the mold plate, adjustable means mounting the other end of the member, means controlled by the thermostatic member when the mold plate reaches a temperature predetermined by the setting of the adjustable means to terminate a cooking operation, and means connecting the cover and the adjustable means to change the setting of the adjustable means when the cover is moved.

13. A cooking device comprising a mold plate, means mounting the mold plate for movement from a cooking position to an ejecting position, resilient means urging the mold plate to its ejecting position, a latch releasably to hold the mold plate in its cooking position, an elongated thermostatic member having a different thermal coefficient of expansion than the mold plate lying generally parallel to the mold plate, means to connect one end of the member to one end of the mold plate, adjustable means mounting the other end of the member for adjustment relative to the other end of the mold plate, means responsive to variations in tension on the member to control the latch, and means operated by movement of the mold plate from its cooking to its ejecting position to change the setting of the adjustable means.

14. A cooking device comprising a mold plate, means mounting the mold plate for movement from a cooking position to an ejecting position, resilient means urging the mold plate to its ejecting position, a latch releasably to hold the mold plate in its cooking position, an elongated thermostatic member having a different thermal coefficient of expansion than the mold plate lying generally parallel to the mold plate, means to connect one end of the member to one end of the mold plate, adjustable means mounting the other end of the member for adjustment relative to the other end of the mold plate, means responsive to variations in tension on the member to control the latch, a cover over the mold plate movable from an open position to a closed position, means to move the mold plate from its ejecting to its cooking position and simultaneously to open the cover, and means operated by the last named means to change the setting of the adjustable means.

15. A cooking device comprising a mold plate, means mounting the mold plate for movement from a cooking to an ejecting position, a cover over the mold plate forming therewith an oven space, heating means to heat the mold plate and the oven space, thermostatic control means in the oven space controlling the heating means, resilient means urging the mold plate to its ejecting position, a latch to hold the mold plate in its cooking position, second thermostatic means responsive to the temperature of the mold plate to control the latch, a longitudinally shiftable shaft for adjusting the second thermostatic means, a cam threadedly carried on the shaft and controlling the first thermostatic means, the cam forming a stop to limit longitudinal shifting of the shaft, means to turn the shaft to adjust the second thermostatic means, and means to turn the cam simultaneously to adjust both of the thermostatic means.

16. A cooking device comprising a mold plate, means mounting the mold plate for movement from a cooking to an ejecting position, a cover over the mold plate forming therewith an oven space, heating means to heat the mold plate and the oven space, thermostatic control means in the oven space controlling the heating means, resilient means urging the mold plate to its ejecting position, a latch to hold the mold plate in its cooking position, second thermostatic means responsive to the temperature of the mold plate to control the latch, a longitudinally shiftable shaft for adjusting the second thermostatic means, a gear threaded on the shaft having an eccentric threaded hub, a cam threaded on the hub and controlling the first thermostatic means, the cam forming a stop to limit longitudinal movement of the shaft, means to turn the shaft to adjust the second thermostatic means, means to turn the cam simultaneously to adjust both of the thermostatic means, and a connection between the gear and the cover to turn the gear and adjust both of the thermostatic means when the cover is moved.

17. A cooking device comprising a mold plate split into a plurality of separate parts with the parts connected at one end of the mold plate, a control member extending along the mold plate in the same general direction as the split and formed of a material having different thermal expansion characteristics than the mold plate, the control member including a pair of elongated relatively rigid end portions flexibly connected in end to end relation at an acute angle to each other with an extension on one end portion partially overlapping the other, means to connect one end portion to said one end of the mold plate, an anchor piece resiliently engaging all of said mold parts adjacent the opposite end of the mold plate and connected to the other end portion, and control means for the cooking device operated by movement of said extension in response to varying tension on the control member.

18. A cooking device comprising a mold plate split into a plurality of separate parts with the parts connected at one end of the mold plate, a control member extending along the mold plate in the same general direction as the split and formed of a material having different thermal expansion characteristics than the mold plate, the control member including a pair of elongated relatively rigid end portions flexibly connected in end to end relation at an acute angle to each other with an extension on one end portion partially overlapping the other, means to connect one end portion to said one end of the mold plate, an anchor piece resiliently engaging all of said mold parts adjacent the opposite end of the mold plate and connected to the other end portion, means mounting the mold plate for pivoting movement from an upright to an inverted position, a spring urging the mold plate to its inverted position, a latch to hold the mold plate in its upright position, and means operated by movement of the extension in response to tension on the control member to release the latch.

19. A cooking device comprising a mold plate split into a plurality of separate parts with the parts connected at one end of the mold plate, a control member extending along the mold plate in the same general direction as the split and formed of a material having different thermal expansion characteristics than the mold plate, the control member including a pair of elongated relatively rigid end portions flexibly connected in end to end relation at an acute angle to each other with an extension on one end portion partially overlapping the other, means to connect one end portion to said one end of the mold plate, an anchor piece resiliently engaging all of said mold parts adjacent the opposite end of the mold plate and connected to the other end portion, means mounting the mold plate for pivoting movement from an upright to an inverted position, a spring urging the mold plate to its inverted position, a latch to hold the mold plate in its upright position, and a flexible strip loaded in compression to hold the latch engaged and normally bent toward the extension and adapted to be bowed by movement of the extension in response to tension on the control member to yield in compression to release the latch.

References Cited in the file of this patent

UNITED STATES PATENTS

| Number | Name | Date |
|---|---|---|
| 358,728 | Campbell | Mar. 1, 1887 |
| 2,038,361 | Hawes | Apr. 21, 1936 |
| 2,237,147 | Ireland | Apr. 1, 1941 |
| 2,243,217 | Lorini | May 27, 1941 |
| 2,266,024 | Gomersall | Dec. 16, 1941 |
| 2,300,061 | Purpura | Oct. 27, 1942 |
| 2,300,551 | Kahn et al. | Nov. 3, 1942 |
| 2,337,124 | Olving | Dec. 21, 1943 |
| 2,364,175 | Turner | Dec. 5, 1944 |
| 2,371,018 | Ashworth et al. | Mar. 6, 1945 |
| 2,414,325 | Newell | Jan. 14, 1947 |
| 2,458,461 | Young et al. | Jan. 4, 1949 |
| 2,459,933 | Gomersall | Jan. 25, 1949 |
| 2,473,719 | McCullough | June 21, 1949 |
| 2,487,276 | Shewmon et al. | Nov. 8, 1949 |
| 2,502,655 | Kitto | Apr. 4, 1950 |
| 2,550,778 | Cohen | May 1, 1951 |
| 2,569,365 | Badenoch | Sept. 25, 1951 |
| 2,581,975 | Snyder | Jan. 8, 1952 |
| 2,590,334 | Loomer | Mar. 25, 1952 |